United States Patent
Baccaro et al.

(10) Patent No.: US 11,225,062 B2
(45) Date of Patent: *Jan. 18, 2022

(54) SILAGE FILM SOLUTIONS

(71) Applicant: SABIC GLOBAL TECHNOLOGIES B.V., Bergen Op Zoom (NL)

(72) Inventors: Lucio Baccaro, Geleen (NL); Attilio Scala, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 21 days.

This patent is subject to a terminal disclaimer.

(21) Appl. No.: 16/622,956

(22) PCT Filed: Jun. 19, 2018

(86) PCT No.: PCT/EP2018/066191
§ 371 (c)(1),
(2) Date: Dec. 16, 2019

(87) PCT Pub. No.: WO2018/234274
PCT Pub. Date: Dec. 27, 2018

(65) Prior Publication Data
US 2021/0146663 A1    May 20, 2021

(30) Foreign Application Priority Data

Jun. 22, 2017  (EP) .................................. 17177288
Jun. 22, 2017  (EP) .................................. 17177291

(51) Int. Cl.
*B32B 27/08* (2006.01)
*B32B 27/32* (2006.01)

(52) U.S. Cl.
CPC ............. *B32B 27/08* (2013.01); *B32B 27/32* (2013.01); *B32B 2250/03* (2013.01); *B32B 2250/05* (2013.01); *B32B 2250/242* (2013.01); *B32B 2307/72* (2013.01); *B32B 2410/00* (2013.01); *B32B 2553/00* (2013.01)

(58) Field of Classification Search
None
See application file for complete search history.

(56) References Cited

U.S. PATENT DOCUMENTS 10,696,014 B2 *  6/2020  Baccaro .................. B32B 27/32
2001/0014401 A1  8/2001  Bonke et al.
2007/0275196 A1  11/2007  Opuszko
2011/0311792 A1  12/2011  Batra et al.
2013/0211356 A1  8/2013  Nishikawa et al.
2018/0229472 A1 *  8/2018  Lee ......................... B32B 27/32
2019/0344532 A1  11/2019  Baccaro et al.

FOREIGN PATENT DOCUMENTS

| EP | 1022131 A1 | 1/2000 |
| EP | 2286658 A2 | 2/2011 |
| WO | 2013081742 A1 | 6/2013 |
| WO | 2018096015 A1 | 5/2018 |
| WO | 2018096016 A1 | 5/2018 |

OTHER PUBLICATIONS

Difference Between LDPE and LLDPE Tubing, TBL Performance Plastics (Year: 2021).*
Butler, "Film Extrusion Manual" 2nd Edition; 2005; pp. 413-435.
International Search Report for International Application PCT/EP2018/066191, International Filing Date Jun. 19, 2018, dated Jul. 23, 2018, 5 pages.
Peacock, Andrew J., "Handbook of Polyethylene", Chapter 3 Production Processes, 2000, Marcel Dekker, Inc., New York; ISBN 0824795466; p. 43-66.
Written Opinion for International Application PCT/EP2018/066191, International Filing Date Jun. 19, 2018, dated Jul. 23, 2018, 6 pages.
Andrew J. Peacock, "Handbook of Polyethylene: Structures, Properties and Applications," Marcel Dekker, Inc., New York, 2000, pp. 43-66.

* cited by examiner

*Primary Examiner* — Ramsey Zacharia
(74) *Attorney, Agent, or Firm* — Cantor Colburn LLP

(57) ABSTRACT

The present invention relates to a multi-layer film comprising at least three layers, with two outer layers, and one core layer, wherein: the core layer comprises an ethylene copolymer comprising 1-octene and having a density between >0.910 g/cm$^3$ and 0.925 g/cm$^3$, wherein further the first outer layer comprises an ethylene homopolymer having a density of between >0.915 g/cm$^3$ and 0.930 g/cm$^3$, wherein further the second outer layer comprises and optional first ethylene copolymer and a second ethylene copolymer having a density of between 0.850 g/cm$^3$ and <0.890 g/cm$^3$. Such film demonstrates improved cling properties and further provides benefits in that a.o. migration of components from this film during storage and use at elevated temperatures is reduced.

14 Claims, No Drawings

SILAGE FILM SOLUTIONS

CROSS REFERENCE TO RELATED APPLICATIONS

This application is a 371 of International Application No. PCT/EP2018/066191, filed Jun. 19, 2018, which is incorporated by reference in its entirety, and which claims priority to European Application Serial No. 17177291.6 filed Jun. 22, 2017 and European Application Serial No. 17177288.2 filed Jun. 22, 2017.

The invention relates to a multi-layer film, especially for silage film application, a silage comprising said film and the use of said film.

Films for silage film applications may be used to wrap silages. Films for silage film applications may especially be stretch silage films and/or bunker silage film. Film for silage film applications can thereby protect the content, especially forage, for example for preferably at least 12 months. Stretch silage films may thereby be adhesive films that can be used, especially for example to protect and store forage in bales that may preferably be round or square.

Films for silage film applications are thereby known, for example from EP2286658, which describes a film comprising at two different ethylene-vinyl acetate based copolymers.

At present, it is common to use polyethylene-based films, particularly multi-layer films, comprising a quantity of polyisobutylene, further also referred to as PIB, in one or more of the film layers, in particular in one of more of the outer layers of such multi-layer film. However, the use of PIB is associated with a number of undesired aspects, for reasons of which a clear need is present to provide a polyethylene-based film that possesses all the desired properties allowing durable use a silage film, without the disadvantageous properties that the use of PIB brings about to such film.

In particular, disadvantageous effects that are caused by the use of PIB affect amongst others the film production process as well as the storage of the films prior to use in packing silage. PIB is, at temperatures in which it is to be fed to a film production line, such as at ambient temperatures, a liquid. Accordingly, the film production lines need to be equipped with liquid dosage systems, which is not only inducing certain capital expenditures to a conventional multi-layer film extrusion line, which commonly are equipped to process polymer pellets in solid form, as used in the majority of material formulations for films, but also is resulting in process control difficulties as the feed of liquid has to be controlled rather precisely. Further, precise process control is also required to ensure that the liquid is well mixed into the formulation during the extrusion process. As an alternative to the liquid dosing, a masterbatch comprising PIB may be used. This however does not contribute to the efficiency of the overall film process, as a masterbatch compounding step has to be included.

A further disadvantage of the use of PIB is that migration can occur, for example during storage. It is common that batch quantities of films are kept at the location near where the silage is to be packaged. This may for example be a farm barn, where climate conditions are not actively controlled, and where certain high temperatures, such as temperatures over 40° C., may be reached. Further, the packaging of silage may be performed at such location, using stationary equipment, or alternatively when collecting from a field, using mobile equipment. During such mobile operations, temperatures may also reach certain heights. At such temperatures, migration of the PIB is prone to occur, which then may result in blocking of the films on for example a roll of film, so that when it is attempted to unwind the films from the roll to be converted to the silage package, breaking of the films or jamming of the equipment occurs with an undesirable frequency. For amongst other these reasons, there is a need to have access to a film for silage packaging that does not contain PIB or only a limited quantity of PIB, which still provides the desirable properties that are specified to such application.

However, despite previous research in the field, there is always a continuous need for films with a good toughness and/or good dart impact and/or good cling properties. Therefore, it is the object of the invention to provide multi-layer films having a good toughness and/or good dart impact and/or good cling properties.

This object in now achieved by a multi-layer film comprising at least three layers, with two outer layers, and one core layer, wherein:

the core layer comprises an ethylene copolymer comprising 1-octene and having a density between >0.910 g/cm$^3$ and 0.925 g/cm$^3$, wherein further the first outer layer comprises an ethylene homopolymer having a density of between >0.915 g/cm$^3$ and 0.930 g/cm$^3$, wherein further the second outer layer comprises and optional first ethylene copolymer and a second ethylene copolymer having a density of between 0.850 g/cm$^3$ and <0.890 g/cm$^3$.

Such film demonstrates improved cling properties and further provides benefits in that a.o. migration of components from this film during storage and use at elevated temperatures is reduced.

In such multi-layer film the second outer layer may for example comprise <50 wt %, >50 wt % and <70 wt %, or >70 wt % of the second ethylene copolymer having a density of between 0.850 g/cm$^3$ and <0.890 g/cm$^3$, with regard to the total weight of the layer, preferably <10 wt %, >10 wt % and <50 wt %, >50 wt % and <70 wt %, or >70 wt %.

The invention also relates to an embodiment of the multi-layer film wherein:

the second ethylene copolymer in the second layer has a melt mass-flow rate as determined in accordance with ISO1133:2011 at 190° C. under a load of 2.16 kg of >0.5 and <10.0 g/10 min, preferably >0.5 and <6.0 g/10 min, preferably >0.5 and <2.5 or >4.0 and <6.0 g/10 min; and/or the first ethylene copolymer in the second layer has a melt mass-flow rate of >0.5 and <3.0 g/10 min; and/or the ethylene copolymer in the core layer has a melt mass-flow rate of 0.5 and <3.0 g/10 min; and/or the ethylene homopolymer in the first outer layer has a melt mass-flow rate of >0.2 and <2.5 g/10 min.

The invention also relates to a further embodiment wherein the multi-layer film comprises at least three layers, with two outer layers, and one core layer, wherein:

the core layer comprises an ethylene copolymer comprising 1-octene and having a density between >0.910 g/cm$^3$ and 0.925 g/cm$^3$, wherein further the first outer layer comprises between 70 wt. % and 95 wt. % of a first ethylene copolymer comprising 1-octene and having a density between >0.910 g/cm$^3$ and 0.925 g/cm$^3$ and between 5 wt. % and 30 wt. % of an ethylene homopolymer having a density between >0.915 g/cm$^3$ and 0.930 g/cm$^3$ based on the total weight of polymers of the layer, wherein further the second outer layer comprises between >50 wt. % and 90 wt. % of a first ethylene copolymer comprising 1-octene and having a density between >0.910 g/cm$^3$ and 0.925 g/cm³ and between 10 wt. % and <50 wt. % of a second ethylene copolymer having an melt flow rate >1.5 g/10 min and a density between 0.850 g/cm³ and <0.890 g/cm³ based on the total weight of the polymers of the layer.

Particularly the invention also relates to a multi-layer film comprising at least five layers, with two intermediate layers, wherein each intermediate layer comprises an ethylene copolymer comprising 1-octene and having a density between >0.910 g/cm³ and 0.925 g/cm³.

In a particular embodiment, the invention relates to a multi-layer film comprising at least three layers, with two outer layers, and one core layer, wherein the core layer comprises an ethylene copolymer comprising 1-octene and having a density between >0.910 g/cm³ and 0.925 g/cm³, wherein further the first outer layer comprises between 70 wt. and 95 wt. % of a first ethylene copolymer comprising 1-octene and having a density between >0.910 g/cm³ and 0.925 g/cm³ and between 5 wt. % and 30 wt. % of an ethylene homopolymer having a density between >0.915 g/cm³ and 0.930 g/cm³ based on the total weight of polymers of the layer, wherein further the second outer layer comprises between >50 wt. % and 90 wt. % of a first ethylene copolymer comprising 1-octene and having a density between >0.910 g/cm³ and 0.925 g/cm³ and between 10 wt. % and <50 wt. % of a second ethylene copolymer having an melt flow rate >1.5 g/10 min and a density between 0.850 g/cm³ and <0.890 g/cm³ based on the total weight of the polymers of the layer.

In another particular embodiment, the invention relates to a multi-layer film comprising at least three layers, with two outer layers, and one core layer, wherein the core layer comprises an ethylene copolymer comprising 1-octene and having a density between >0.910 g/cm³ and 0.925 g/cm³, wherein further the first outer layer comprises between >60 wt. % and <95 wt. % of a first ethylene copolymer comprising 1-octene and having a density between >0.910 g/cm³ and 0.925 g/cm³ and between 5 wt. % and 30 wt. % of an ethylene homopolymer having a density between >0.915 g/cm³ and 0.930 g/cm³ based on the total weight of polymers of the layer, wherein further the second outer layer comprises between >40 wt. % and 90 wt. % of a first ethylene copolymer comprising 1-octene and having a density between >0.910 g/cm³ and 0.925 g/cm³ and between 10 wt. % and <50 wt. % of a second ethylene copolymer having an melt flow rate >1.5 g/10 min and a density between 0.850 g/cm³ and <0.890 g/cm³ based on the total weight of the polymers of the layer.

In one embodiment, a multi-layer film according to the invention may comprise for example at least five layers, with two intermediate layers, wherein each intermediate layer comprises an ethylene copolymer comprising 1-octene and having a density between >0.910 g/cm³ and 0.925 g/cm³.

With outer layers are meant the layers that are located on the outside of the film. The outer layers may thus preferably adjacent to only one other layer of the multi-layer film according to the invention on only one of their sides. As compared to other layers in the multi-layer film of the invention, the outer layers have a substantially larger portion of the layer that faces the outside. With core layer is meant a layer that is located between at least two outer layers and/or at least two intermediate layers, preferably in the middle of the multi-layer arrangement of the multi-layer film according to the invention, especially when the multi-layer film is film with at least five or exactly five layers. Intermediate layer may thereby designate a layer that is located between at least one outer layer and at least one core layer.

An intermediate layer may thereby be adjacent to at least outer layer and/or at least one core layer.

With adjacent layer, as used herein, is meant a layer that is in direct contact with the layer to which it is described as adjacent. In direct contact may thereby mean that preferably no further layer is arranged between two layers which are in direct contact. Each adjacent layer to an outer layer would therefore be in direct contact with that outer layer. A layer adjacent to at least one outer layer may thereby be for example an intermediate layer. A layer adjacent to at least one intermediate layer may thereby be for example a core layer.

The three or five layers of a multi-layer film according to the invention may preferably be adjacent to each other. This may mean that the core layer is in direct contact with both intermediate layers and that each intermediate layer is in direct contact with one of the outer layers.

An ethylene copolymer may be a copolymer of ethylene and at least one α-olefin, preferably for example an α-olefin with 3 to 10 carbon atoms (C3-C10 alpha-olefin), such as for example 1-butene, 1-pentene, 1-hexene, 1-octene, or 4-methyl-1-pentene, most preferably 1-butene, 1-hexene or 1-octene.

In a multi-layer film according to the invention, the first outer may comprise for example between 75 wt. % and <95 wt. %, preferably between >80 wt. % and <93 wt. % of the first ethylene copolymer comprising 1-octene and between >5 wt. % and 25 wt. %, preferably between >7 wt. % and <20 wt. %, of the ethylene homopolymer based on the total weight of polymers of the layer. This may further contribute to good toughness and/or good dart impact and/or good cling properties.

In a multi-layer according to the invention, the second outer layer may comprise for example wherein the second outer layer comprises for between 55 wt. % and 85 wt. %, preferably between >57 wt. % and <83 wt. %, of the first ethylene copolymer comprising 1-octene and between 15 wt. % and 45 wt. %, preferably between >17 wt. % and <43 wt. %, of the second ethylene copolymer based on the total weight of the polymers of the layer. This may further contribute to good toughness and/or good dart impact and/or good cling properties.

In a multi-layer according to the invention, the core layer and/or each intermediate layer may comprise for example between 90 wt. % and 100 wt. %, preferably 100 wt. %, of their respective ethylene copolymer based on the total weight of the polymers of the layer. This may further contribute to good toughness and/or good dart impact and/or good cling properties.

In an embodiment of a multi-layer film according to the invention the multilayer film may for example consist of three layers and/or consist of five layers and/or may be an embodiment wherein both outer layers may comprise the same first ethylene copolymer and/or may be an embodiment wherein the multi-layer film may comprise no polypropylene and/or may be an embodiment wherein the multi-layer film is a multi-layer film for silage film applications and/or may be an embodiment wherein the three layers or five layers are adjacent to each other.

In a multi-layer film according to the invention, each layer may comprise <10 wt %, preferably between 2 and 8 wt %, further preferred between 4 and 6 wt % of polyisobutylene (PIB) based on the total weight of polymers of the layer. Alternatively, each layer may be free of polyisobutylene.

In a multi-layer film according to the invention, the ethylene copolymer of the core layer comprises 1-hexene or 1-octene. This may contribute to good toughness and/or good dart impact and/or good cling properties.

In a multi-layer film according to the invention, wherein the multi-layer film and/or each of the three or five layers thereof comprises only polyolefins as polymers.

In a multilayer film according to the invention, the second ethylene copolymer of the second outer layer may comprise 1-hexene or 1-octene. This may contribute to good toughness and/or good dart impact and/or good cling properties.

In a multi-layer film according to the invention, the density of the ethylene copolymer of the core layer may be for example between 0.913 and 0.923 g/cm$^3$, preferably between >0.913 and <0.923 g/cm$^3$ and/or the melt flow rate of the ethylene copolymer of the core layer may be for example between 0.2 and 2.5 g/10 min, preferably between 0.5 and 1.5 g/10 min, further between >1 and 1.5 g/10 min.

In a multi-layer film according to the invention, the density of the ethylene copolymer of the intermediate layer may be for example between 0.913 g/cm$^3$ and 0.923 g/cm$^3$, preferably between >0.913 g/cm$^3$ and <0.923 g/cm$^3$ and/or the melt flow rate of the ethylene copolymer of the intermediate layer may be for example between 0.2 and 2.5 g/10 min, preferably between 0.5 and 1.5 g/10 min, further preferred between >1 and 1.5 g/10 min.

In a multi-layer film according to the invention, the density of the first ethylene copolymer of the first outer layer may be for example between 0.913 g/cm$^3$ and 0.923 g/cm$^3$, preferably between >0.913 g/cm$^3$ and <0.923 g/cm$^3$ and/or the melt flow rate of the ethylene copolymer of the intermediate layer may be for example between 0.2 and 2.5 g/10 min, preferably between 0.5 and 1.5 g/10 min, further preferred between >1 and 1.5 g/10 min.

In a multi-layer film according to the invention, the density of the first ethylene copolymer of the second outer layer may be for example between 913 g/cm$^3$ and 0.923 g/cm$^3$, preferably between >0.913 g/cm$^3$ and <0.923 g/cm$^3$ and/or the melt flow rate of the first ethylene copolymer of the second outer layer may be for example between 0.2 and 2.5 g/10 min, preferably between 0.5 and 1.5 g/10 min, further preferred between >1 and 1.5 g/10 min.

In a multi-layer film according to the invention, the density of the ethylene homopolymer of the first outer layer may be for example between 0.917 g/cm$^3$ and 0.927 g/cm$^3$, preferably between >0.918 g/cm$^3$ and <0.925 g/cm$^3$ and/or the melt flow rate of the ethylene copolymer of the second ethylene copolymer of the first outer layer may be preferably between 0.2 and 2.5 g/10 min, preferably between >0.6 and <1 g/10 min.

In a multi-layer film according to the invention, the density of the second ethylene copolymer of the second outer layer may be for example between 0.855 g/cm$^3$ and 0.885 g/cm$^3$, preferably between >0.855 g/cm$^3$ and 0.875 g/cm$^3$, preferably between 0.857 g/cm$^3$ and <0.875 g/cm$^3$, and/or the melt flow rate of the ethylene copolymer of the second ethylene copolymer of the second outer layer may be for example between 1.7 and 20 g/10 min, preferably between 2 and 17 g/10 min, further preferred between 2.5 and 15 g/10 min.

In a multi-layer film according to the invention, the density of the second ethylene copolymer of the second outer layer may be for example between 0.855 g/cm$^3$ and 0.885 g/cm$^3$, preferably between >0.860 g/cm$^3$ and 0.875 g/cm$^3$, preferably between 0.860 g/cm$^3$ and <0.875 g/cm$^3$, and/or the melt flow rate of the ethylene copolymer of the second ethylene copolymer of the second outer layer may be for example between 1.7 and 20 g/10 min, preferably between 2 and 17 g/10 min, further preferred between 2.5 and 15 g/10 min.

For the purpose of the invention, the density may be determined for example using ISO1873 (A) or ASTM-D 1505 or ASTM D 792.

For the purpose of the invention, the melt flow rate may be determined for example using ISO1133:2011 (190° C./2.16 kg) or ASTM D1238 (190° C./2.16 kg). The melt flow rate may be understood to be the melt mass flow rate and may be abbreviated as MFR.

In the multi-layer film of the invention, the core layer and/or the intermediate layers and/or outer layers may for example comprise polyethylene, especially for example linear low density polyethylene and/or high density polyethylene and/or low density polyethylene and/or an ethylene copolymer and/or polypropylene and/or blends of two or more of thereof.

Besides polymers, each layer may also comprise other compounds. For example, each layer may especially further comprise additives as other compounds, especially for example additives as described herein.

A multi-layer film according to the invention may comprise at least one, preferably exactly one, core layer.

A multi-layer film according to the invention may comprise exactly three or exactly five layers.

The production processes of LDPE, HDPE and LLDPE are summarized in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalyzed polymer is obtained via the interaction of an organometallic compound or hydride of a Group I-Ill metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

An ethylene copolymer according to the present invention may thereby especially be linear low density polyethylene (LLDPE) and/or a polyolefin plastomer and/or a polyolefin elastomer.

With linear low density polyethylene (LLDPE) as used herein is meant a low density polyethylene copolymer ethylene-alpha olefin copolymer) comprising ethylene and a C3-C10 alpha-olefin co-monomer. Suitable alpha-olefin co-monomers include 1-butene, 1-hexene, 4-methyl-1-pentene and 1-octene.

Preferably, the alpha-olefin co monomer may be present for example in an amount of about 1 to about 25, preferably 5 to about 20 percent by weight of the ethylene-alpha olefin copolymer, preferably of 5 to about 20 percent by weight of the ethylene-alpha olefin copolymer, more preferably an amount of from about 7 to about 15 percent by weight of the ethylene-alpha olefin copolymer. LLDPE, as used herein, may be produced for example using metallocene and/or Ziegler-Natta catalysts.

The technologies suitable for the LLDPE manufacture include but are not limited to gas-phase fluidized-bed polymerization, polymerization in solution, and slurry polymerization.

According to a preferred embodiment of the present invention the LLDPE has been obtained by gas phase polymerization in the presence of a Ziegler-Natty catalyst. According to another preferred embodiment, the LLDPE may be obtained by gas phase or slurry polymerization in the presence of a metallocene catalyst.

The components of the each layer according to the invention may preferably for example add up to 100 wt. % of the each layer or to 100 wt. % of the polymer content of each layer.

The thickness of multi-layer film of the invention may range for example from 5 to 100 μm, preferably from 10 to 50 μm, further preferred from 15 to 30 μm. Not all layers in the multi-layer film of the invention need to have the same thickness. For example, one or more layers in the multi-layer film may be thicker than the other layers, especially for example to increase the stability of the production process.

In a multi-layer film according to the invention, the thickness of each outer layer may represent between 10% and 20% of the total film thickness, preferably 15% of the total film thickness and/or the thickness of each intermediate layer may represent between 15% and 25% of the total film thickness, preferably 20% of the total film thickness and/or the thickness of the core layer may represent between 60% or 80% of the total film thickness or between 25% and 35% of the total film thickness, preferably 70% or 30% of the total film thickness.

Moreover, each layer of the multi-layer film of the invention may comprise an amount of additives of 0 to 25 wt. %, especially for example 1 to 10 wt. % especially for example 0 to 8 wt. % or 2 to 7 wt. % based on the total weight of the layer. The rest of each layer may thereby be made up of polymers.

Additives may thereby especially for example be UV stabilizers, fillers, antioxidants, pigments, fluor elastomers used as polymer processing aids and/or mixtures of two or more thereof. Especially for example an erucamide and/or an oleamide and/or silica and/or talc.

A multi-layer film according to the invention may comprise at least three layers or exactly three layer, whereby the multi-layer film is multi-layer film for silage film applications with two outer layers and one core layer, wherein the core layer comprises an ethylene copolymer comprising 1-octene and having a density between >0.910 g/cm$^3$ and 0.925 g/cm$^3$, wherein further the first outer layer may comprise between 75 wt. % and <95 wt. %, of the first ethylene copolymer comprising 1-octene and between >5 wt. % and 25 wt. % of the ethylene homopolymer based on the total weight of polymers of the layer and the second outer layer may comprise between 55 wt. % and 85 wt. % of the first ethylene copolymer comprising 1-octene and between 15 wt. % and 45 wt. % of the second ethylene copolymer based on the total weight of the polymers of the layer, wherein the density of the ethylene copolymer of the core layer and the density of the first ethylene copolymer of the first outer layer as well as the density of the first ethylene copolymer of the second outer layer may be between >0.913 and <0.923 g/cm$^3$, wherein the density of the second ethylene copolymer of the second outer layer may be 0.857 g/cm$^3$ and <0.875 g/cm$^3$, wherein the melt flow rate of the second ethylene copolymer of the second outer layer may be between 2 and 17 g/10 min, wherein the density of the ethylene homopolymer of the first outer layer may be >0.918 g/cm$^3$ and <0.925 g/cm$^3$, wherein the multi-layer film and/or each of the three layers comprises only polyolefins as polymers and/or wherein further the three layers are adjacent to each other.

A multi-layer film according to the invention may comprise at least five layers or exactly five layer, whereby the multi-layer film is multi-layer film for silage film applications with two outer layers, two intermediate layers and one core layer, wherein the core layer comprises an ethylene copolymer comprising 1-octene and having a density between >0.910 g/cm$^3$ and 0.925 g/cm$^3$, the intermediate layers comprise an ethylene copolymer comprising 1-octene and having a density between >0.910 g/cm$^3$ and 0.925 g/cm$^3$, wherein further the first outer layer may comprise between 75 wt. % and <95 wt. %, of the first ethylene copolymer comprising 1-octene and between >5 wt. % and 25 wt. % of the ethylene homopolymer based on the total weight of polymers of the layer and the second outer layer may comprise between 55 wt. % and 85 wt. % of the first ethylene copolymer comprising 1-octene and between 15 wt. % and 45 wt. % of the second ethylene copolymer based on the total weight of the polymers of the layer, wherein the density of the ethylene copolymer of the core layer and the density of the first ethylene copolymer of the first outer layer as well as the density of the first ethylene copolymer of the second outer layer may be between >0.913 and <0.923 g/cm$^3$, wherein the density of the second ethylene copolymer of the second outer layer may be 0.857 g/cm$^3$ and <0.875 g/cm$^3$, wherein the melt flow rate of the second ethylene copolymer of the second outer layer may be between 2 and 17 g/10 min, wherein the density of the ethylene homopolymer of the first outer layer may be >0.918 g/cm$^3$ and <0.925 g/cm$^3$, wherein the multi-layer film and/or each of the five layers comprises only polyolefins as polymers and/or wherein further the five layers are adjacent to each other.

A multi-layer film according to the invention may comprise at least three layers or exactly three layer, whereby the multi-layer film is multi-layer film for silage film applications with two outer layers and one core layer, wherein the core layer comprises an ethylene copolymer comprising 1-octene and having a density between >0.910 g/cm$^3$ and 0.925 g/cm$^3$, wherein further the first outer layer may comprise between 67 wt. % and <93 wt. %, of the first ethylene copolymer comprising 1-octene and between >5 wt. % and 25 wt. % of the ethylene homopolymer based on the total weight of polymers of the layer and the second outer layer may comprise between 47 wt. % and 83 wt. % of the first ethylene copolymer comprising 1-octene and between 15 wt. % and 45 wt. % of the second ethylene copolymer based on the total weight of the polymers of the layer, wherein the density of the ethylene copolymer of the core layer and the density of the first ethylene copolymer of the first outer layer as well as the density of the first ethylene copolymer of the second outer layer may be between >0.913 and <0.923 g/cm$^3$, wherein the density of the second ethylene copolymer of the second outer layer may be 0.860 g/cm$^3$ and <0.875 g/cm$^3$, wherein the density of the ethylene homopolymer of the first outer layer may be >0.918 g/cm$^3$ and <0.925 g/cm$^3$, wherein each layer may comprise between 2 and 8 wt % of polyisobutylene (PIB) based on the total weight of polymer of the layer, wherein the multi-layer film and/or each of the three layers comprises only polyolefins and polyisobutylenes as polymers and/or wherein further the three layers are adjacent to each other.

A multi-layer film according to the invention may comprise at least five layers or exactly five layer, whereby the multi-layer film is multi-layer film for silage film applications with two outer layers, two intermediate layers and one core layer, wherein the core layer comprises an ethylene copolymer comprising 1-octene and having a density between >0.910 g/cm$^3$ and 0.925 g/cm$^3$, the intermediate layers comprise an ethylene copolymer comprising 1-octene and having a density between >0.910 g/cm$^3$ and 0.925 g/cm$^3$, wherein further the first outer layer may comprise between 67 wt. % and <93 wt. %, of the first ethylene copolymer comprising 1-octene and between >5 wt. % and 25 wt. % of the ethylene homopolymer based on the total weight of polymers of the layer and the second outer layer may comprise between 47 wt. % and 83 wt. % of the first ethylene copolymer comprising 1-octene and between 15 wt. % and 45 wt. % of the second ethylene copolymer based on the total weight of the polymers of the layer, wherein the density of the ethylene copolymer of the core layer and the density of the first ethylene copolymer of the first outer layer as well as the density of the first ethylene copolymer of the second outer layer may be between >0.913 and <0.923 g/cm$^3$, wherein the density of the second ethylene copolymer of the second outer layer may be 0.860 g/cm$^3$ and <0.875 g/cm$^3$, wherein the density of the ethylene homopolymer of the first outer layer may be >0.918 g/cm$^3$ and <0.925 g/cm$^3$, wherein each layer may comprise between 2 and 8 wt % of polyisoputylene (PIB) based on the total weight of polymers in the layer, wherein the multi-layer film and/or each of the five layers comprises only polyolefins and polyisobutylene as polymers and/or wherein further the five layers are adjacent to each other.

The multi-layer films of the present invention may be prepared by any method known in the art. Multi-layer structures may be prepared for example by a blown film co-extrusion process, for example as disclosed in "Film Extrusion Manual", (TAPPI PRESS, 2005, ISBN 1-59510-075-X, Editor Butler, pages 413-435).

For example, in the process of coextrusion, the various resins may be first melted in separate extruders and then brought together in a feed block. The feed block is a series of flow channels which bring the layers together into a uniform stream. From this feed block, this multi-layer material then flows through an adapter and out a film die. The blown film die may be an annular die. The die diameter may be a few centimeters to more than three meters across. The molten plastic is pulled upwards from the die by a pair of nip rolls high above the die (from for example 4 meters to more than 20 meters). Changing the speed of these nip rollers will change the gauge (wall thickness) of the film. Around the die an air-ring may be provided. The air exiting the air-ring cools the film as it travels upwards. In the center of the die there may be an air outlet from which compressed air can be forced into the center of the extruded circular profile, creating a bubble. This expands the extruded circular cross section by some ratio (a multiple of the die diameter). This ratio, called the "blow-up ratio" can be just a few percent to for example more than 300 percent of the original diameter. The nip rolls flatten the bubble into a double layer of film whose width (called the "layflat") is equal to ½ of the circumference of the bubble. This film may then be spooled or printed on, cut into shapes, and heat sealed into bags or other items.

The present invention also concerns a silage comprising a multi-layer film according to the invention. The present invention also concerns a packaging for silage comprising a multi-layer film according to the invention.

Furthermore, the present invention also concerns the use of the multi-layer film according to the invention for silage film applications.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

In the context of the present invention, an ethylene copolymer comprising 1-octene is to be understood to be an ethylene copolymer comprising moieties derived from 1-octene. Similarly, an ethylene copolymer comprising 1-hexene is to be understood to be an ethylene copolymer comprising moieties derived from 1-hexene.

The invention further also relates to aspects as presented herein below.

Aspect 1: Multi-layer film comprising at least three layers, with two outer layers, and one core layer, wherein the core layer comprises an ethylene copolymer comprising 1-octene and having a density between >0.910 g/cm$^3$ and 0.925 g/cm$^3$, wherein further the first outer layer comprises between 70 wt. % and 95 wt. % of a first ethylene copolymer comprising 1-octene and having a density between >0.910 g/cm$^3$ and 0.925 g/cm$^3$ and between 5 wt. % and 30 wt. % of an ethylene homopolymer having a density between >0.915 g/cm$^3$ and 0.930 g/cm$^3$ based on the total weight of polymers of the layer, wherein further the second outer layer comprises between >50 wt. % and 90 wt. % of a first ethylene copolymer comprising 1-octene and having a density between >0.910 g/cm$^3$ and 0.925 g/cm$^3$ and between 10 wt. % and <50 wt. % of a second ethylene copolymer having an melt flow rate >1.5 g/10 min and a density between 0.850 g/cm$^3$ and <0.890 g/cm$^3$ based on the total weight of the polymers of the layer.

Aspect 2: Multi-layer film according to aspect 1 comprising at least five layers, with two intermediate layers, wherein each intermediate layer comprises an ethylene copolymer comprising 1-octene and having a density between >0.910 g/cm$^3$ and 0.925 g/cm$^3$.

Aspect 3: Multi-layer film according to aspect 1 or aspect 2, wherein the first outer comprises between 75 wt. % and <95 wt. %, preferably between >80 wt. % and <93 wt. % of the first ethylene copolymer comprising 1-octene and between >5 wt. % and 25 wt. %, preferably between >7 wt. % and <20 wt. %, of the ethylene homopolymer based on the total weight of polymers of the layer and/or wherein the second outer layer comprises for between 55 wt. % and 85 wt. %, preferably between >57 wt. % and <83 wt. %, of the first ethylene copolymer comprising 1-octene and between 15 wt. % and 45 wt. %, preferably between >17 wt. % and <43 wt. %, of the second ethylene copolymer based on the total weight of the polymers of the layer and/or wherein the core layer and/or each intermediate layer comprises between 90 wt. % and 100 wt. %, preferably 100 wt. %, of their respective ethylene copolymer based on the total weight of the polymers of the layer.

Aspect 4: Multi-layer film according to one of aspects 1-3, wherein the multilayer film consists of three layers and/or the multi-layer film consists of five layers and/or wherein both outer layers comprise the same first ethylene copolymer and/or wherein the multi-layer film comprises no polypropylene and/or wherein the multi-layer film is a multi-layer film for silage film applications and/or wherein the three layers or five layers are adjacent to each other.

Aspect 5: Multi-layer film according to any one of aspects 1-4, wherein the multi-layer film and/or each of the three or five layers thereof comprises only polyolefins as polymers.

Aspect 6: Multilayer film according to any one of aspects 1-5, wherein the second ethylene copolymer of the second outer layer comprises 1-hexene or 1-octene.

Aspect 7: Multi-layer film according to any one of aspects 1-6, wherein the density of the ethylene copolymer of the core layer is between 0.913 and 0.923 g/cm$^3$, preferably between >0.913 and <0.923 g/cm$^3$ and/or the melt flow rate of the ethylene copolymer of the core layer is between 0.2 and 2.5 g/10 min, preferably between 0.5 and 1.5 g/10 min, further between >1 and 1.5 g/10 min.

Aspect 8: Multi-layer film according to any one of aspects 1-7, wherein the density of the ethylene copolymer of the intermediate layer is between 0.913 g/cm$^3$ and 0.923 Worn', preferably between >0.913 g/cm$^3$ and <0.923 g/cm$^3$ and/or the melt flow rate of the ethylene copolymer of the intermediate layer is between 0.2 and 2.5 g/10 min, preferably between 0.5 and 1.5 g/10 min, further preferred between >1 and 1.5 g/10 min.

Aspect 9: Multi-layer film according to any one of aspects 1-8, wherein the density of the first ethylene copolymer of the first outer layer is between 0.913 g/cm$^3$ and 0.923 g/cm$^3$, preferably between >0.913 g/cm$^3$ and <0.923 g/cm$^3$ and/or the melt flow rate of the ethylene copolymer of the intermediate layer is between 0.2 and 2.5 g/10 min, preferably between 0.5 and 1.5 g/10 min, further preferred between >1 and 1.5 g/10 min.

Aspect 10: Multi-layer film according to any one of aspects 1-9, wherein the density of the first ethylene copolymer of the second outer layer is between 913 g/cm$^3$ and 0.923 g/cm$^3$, preferably between >0.913 g/cm$^3$ and <0.923 g/cm$^3$ and/or the melt flow rate of the first ethylene copolymer of the second outer layer is between 0.2 and 2.5 g/10 min, preferably between 0.5 and 1.5 g/10 min, further preferred between >1 and 1.5 g/10 min.

Aspect 11: Multi-layer film according to any one of aspects 1-10, wherein the density of the ethylene homopolymer of the first outer layer is between 0.917 g/cm$^3$ and 0.927 g/cm$^3$, preferably between >0.918 g/cm$^3$ and <0.925 g/cm$^3$ and/or the melt flow rate of the ethylene copolymer of the second ethylene copolymer of the first outer layer is between 0.2 and 2.5 g/10 min, preferably between >0.6 and <1 g/10 min.

Aspect 12: Multi-layer film according to any one of aspects 1-11, wherein the density of the second ethylene copolymer of the second outer layer is between 0.855 g/cm$^3$ and 0.885 g/cm$^3$, preferably between >0.855 g/cm$^3$ and 0.875 g/cm$^3$, preferably between 0.857 g/cm$^3$ and <0.875 g/cm$^3$, and/or the melt flow rate of the ethylene copolymer of the second ethylene copolymer of the second outer layer is between 1.7 and 20 g/10 min, preferably between 2 and 17 g/10 min, further preferred between 2.5 and 15 g/10 min.

Aspect 13: Multi-layer film according to any one of the aspects 1 to 12, wherein the thickness of each outer layer represents between 10% and 20% of the total film thickness, preferably 15% of the total film thickness and/or the thickness of each intermediate layer represents between 15% and 25% of the total film thickness, preferably 20% of the total film thickness and/or the thickness of the core layer represents between 60% or 80% of the total film thickness or between 25% and 35% of the total film thickness, preferably 70% or 30% of the total film thickness.

Aspect 14: Silage comprising a multi-layer film according to any one of aspects 1-13.

Aspect 15: Use of the multi-layer film according to any one of aspects 1-13 for silage film applications.

Aspect 16: Multi-layer film comprising at least three layers, with two outer layers, and one core layer, wherein the core layer comprises an ethylene copolymer comprising 1-octene and having a density between >0.910 g/cm$^3$ and 0.925 g/cm$^3$, wherein further the first outer layer comprises between >60 wt. % and 95 wt. % of a first ethylene copolymer comprising 1-octene and having a density between >0.910 g/cm$^3$ and 0.925 g/cm$^3$ and between 5 wt. % and 30 wt. % of an ethylene homopolymer having a density between >0.915 g/cm$^3$ and 0.930 g/cm$^3$ based on the total weight of polymers of the layer, wherein further the second outer layer comprises between >40 wt. % and <90 wt. % of a first ethylene copolymer comprising 1-octene and having a density between >0.910 g/cm$^3$ and 0.925 g/cm$^3$ and between 10 wt. % and <50 wt. % of a second ethylene copolymer having a density between 0.850 g/cm$^3$ and <0.890 g/cm$^3$ based on the total weight of the polymers of the layer.

Aspect 17: Multi-layer film according to aspect 16 comprising at least five layers, with two intermediate layers, wherein each intermediate layer comprises an ethylene copolymer comprising 1-octene and having a density between >0.910 g/cm$^3$ and 0.925 g/cm$^3$.

Aspect 18: Multi-layer film according to aspect 16 or aspect 17, wherein the first outer comprises between 67 wt. % and <93 wt. %, preferably between >74 wt. % and <89 wt. % of the first ethylene copolymer comprising 1-octene and between >5 wt. % and 25 wt.

%, preferably between >7 wt. % and <20 wt. %, of the ethylene homopolymer based on the total weight of polymers of the layer and/or wherein the second outer layer comprises for between 47 wt. % and 83 wt. %, preferably between >51 wt. % and <79 wt. %, of the first ethylene copolymer comprising 1-octene and between 15 wt. % and 45 wt. %, preferably between >17 wt. % and <43 wt. %, of the second ethylene copolymer based on the total weight of the polymers of the layer and/or wherein the core layer and/or each intermediate layer comprises between 90 wt. % and 100 wt. %, preferably 100 wt. %, of their respective ethylene copolymer based on the total weight of the polymers of the layer.

Aspect 19: Multi-layer film according to one of aspects 16-18, wherein the multilayer film consists of three layers and/or the multi-layer film consists of three or five layers and/or wherein both outer layers comprise the same first ethylene copolymer and/or wherein the multi-layer film and/or each of the three or five layers thereof comprises only polyolefins and polyisobutylene as polymers and/or wherein the multi-layer film comprises no polypropylene and/or wherein the multi-layer film is a multi-layer film for silage film applications and/or wherein the three layers or five layers are adjacent to each other.

Aspect 20: Multi-layer film according to any one of aspects 16-19, wherein each layer comprises <10 wt. %, preferably between 2 and 8 wt. %, further preferred between 4 and 6 wt. % of polyisobutylene (PIB) based on the total weight of polymers of the layer.

Aspect 21: Multi-layer film according to any one of aspects 16-20, wherein the second ethylene copolymer of the second outer layer comprises 1-hexene or 1-octene.

Aspect 22: Multi-layer film according to any one of aspects 16-21, wherein the density of the ethylene copolymer of the core layer is between 0.913 and 0.923 g/cm$^3$, preferably between >0.913 and <0.923 g/cm³ and/or the melt flow rate of the ethylene copolymer of the core layer is between 0.2 and 2.5 g/10 min, preferably between 0.5 and 1.5 g/10 min, further between >1 and 1.5 g/10 min.

Aspect 23: Multi-layer film according to any one of aspects 16-22, wherein the density of the ethylene copolymer of the intermediate layer is between 0.913 g/cm³ and 0.923 g/cm³, preferably between >0.913 g/cm³ and <0.923 g/cm³ and/or the melt flow rate of the ethylene copolymer of the intermediate layer is between 0.2 and 2.5 g/10 min, preferably between 0.5 and 1.5 g/10 min, further preferred between ≥1 and 1.5 g/10 min.

Aspect 24: Multi-layer film according to any one of aspects 16-23, wherein the density of the first ethylene copolymer of the first outer layer is between 0.913 g/cm³ and 0.923 g/cm³, preferably between >0.913 g/cm³ and <0.923 g/cm³ and/or the melt flow rate of the ethylene copolymer of the intermediate layer is between 0.2 and 2.5 g/10 min, preferably between 0.5 and 1.5 g/10 min, further preferred between ≥1 and 1.5 g/10 min.

Aspect 25: Multi-layer film according to any one of aspects 16-24, wherein the density of the first ethylene copolymer of the second outer layer is between 0.913 g/cm³ and 0.923 g/cm³, preferably between >0.913 g/cm³ and <0.923 g/cm³ and/or the melt flow rate of the first ethylene copolymer of the second outer layer is between 0.2 and 2.5 g/10 min, preferably between 0.5 and 1.5 g/10 min, further preferred between >1 and 1.5 g/10 min.

Aspect 26: Multi-layer film according to any one of aspects 16-25, wherein the density of the ethylene homopolymer of the first outer layer is between 0.917 g/cm³ and 0.927 g/cm³, preferably between >0.918 g/cm³ and <0.925 g/cm³ and/or the melt flow rate of the ethylene copolymer of the second ethylene copolymer of the first outer layer is between 0.2 and 2.5 g/10 min, preferably between >0.6 and <1 g/10 min.

Aspect 27: Multi-layer film according to any one of aspects 16-26, wherein the density of the second ethylene copolymer of the second outer layer is between 0.855 g/cm³ and 0.885 g/cm³, preferably between 0.860 g/cm³ and 0.875 g/cm³, preferably between >0.860 g/cm³ and <0.875 g/cm³, and/or the melt flow rate of the ethylene copolymer of the second ethylene copolymer of the second outer layer is between 0.2 and 2.5 g/10 min, preferably between 0.5 and 1.5 g/10 min, further preferred between 0.75 and 1.25 g/10 min.

Aspect 28: Multi-layer film according to any one of the aspects 16 to 27, wherein the thickness of each outer layer represents between 10% and 20% of the total film thickness, preferably 15% of the total film thickness and/or the thickness of each intermediate layer represents between 15% and 25% of the total film thickness, preferably 20% of the total film thickness and/or the thickness of the core layer represents between 60% or 80% of the total film thickness or between 25% and 35% of the total film thickness, preferably 70% or 30% of the total film thickness.

Aspect 29: Silage comprising a multi-layer film according to any one of aspects 16-28.

Aspect 30: Use of the multi-layer film according to any one of aspects 16-29 for silage film applications.

The invention will now be illustrated by the following non-limiting examples.

5-layer films were produced using the following materials:

| | |
|---|---|
| LDPE 2501N0W | Polyethylene low-density polyethylene homopolymer, having a density of 0.925 g/cm³ and an MFR of 0.75 g/10 min, commercially available from SABIC. |
| Supeer 8115 | Linear low-density polyethylene copolymer, comprising moieties derived from 1-octene, having a density of 0.915 g/cm³ and an MFR of 1.1 g/10 min, commercially available from SABIC. |
| Cohere 8570 | Ethylene-1-octene copolymer having a density of 0.868 g/cm³ and an MFR of 5 g/10 min, commercially available from SABIC. |
| Escorene Ultra FL00218 | Ethylene-vinyl acetate copolymer, having a density of 0.940 g/cm³ and an MFR of 1.7 g/10 min, commercially available from ExxonMobil. |
| PIB | Polyisobutylene masterbatch TAC100 comprising 60 wt % polyisobutylene, obtainable from A. Schulman. |
| Exceed 2018HA | Ethylene-1-hexene copolymer having a density of 0.918 g/cm³ and an MFR of 2 g/10 min, obtainable from ExxonMobil. |
| Exceed 1018HA | Ethylene-1-hexene copolymer having a density of 0.918 g/cm³ and an MFR of 1 g/10 min, obtainable from ExxonMobil. |
| Enable 2703HH | Ethylene-1-hexene copolymer having a density of 0.927 g/cm³ and an MFR of 0.3 g/10 min, obtainable from ExxonMobil. |

Example 1. A film according to the invention was produced on a 5-layer co-extrusion blown film line as described below.

Line description and process settings:

| | |
|---|---|
| Number of extruders | 5 |
| Number of layers | 5 |
| Thickness | 25 μm |
| BUR (blow-up rate) | 2.5 |
| Die | Gap: 2.4 mm; diameter 550 mm. |
| Dual ring | Double flow air ring, contactless type. |
| Air cooling temperature | 15° C. |
| Ring | 52% of total power |
| IBC | 60% power |
| Line speed | 61 m/min |
| Output | 352 kg/h |

Extruder temperature profiles (° C.):

| | Extruder A | Extruder B | Extruder C | Extruder D | Extruder E |
|---|---|---|---|---|---|
| Zone 1 | 40 | 40 | 40 | 40 | 40 |
| Zone 2 | 210 | 210 | 210 | 210 | 210 |
| Zone 3 | 210 | 210 | 210 | 210 | 210 |
| Zone 4 | 210 | 210 | 210 | 210 | 210 |
| Zone 5 | — | — | 210 | — | — |
| Filter 1 | 210 | 210 | 210 | 210 | 210 |
| Filter 2 | 210 | 210 | 210 | 210 | 210 |
| Filter 3 | 210 | 210 | 210 | 210 | 210 |

Die temperature profile (° C.):

| Zone A1 | Zone A2 | Zone A3 | Zone B | Zone C | Zone D | Zone E |
|---------|---------|---------|--------|--------|--------|--------|
| 215     | 215     | 215     | 210    | 210    | 210    | 210    |

| Zone F | Zone G | Zone I | Zone H | Zone L | Zone M |
|--------|--------|--------|--------|--------|--------|
| 210    | 210    | 210    | 210    | 210    | 210    |

Extruder settings:

|            | Speed (rpm) | Torque (%) | Pressure IN (bar) | Pressure OUT (bar) | Melt temp (° C.) |
|------------|-------------|------------|-------------------|--------------------|--------------------|
| Extruder A | 54.3        | 19         | 83                | 63                 | 215                |
| Extruder B | 55.2        | 54         | 182               | 134                | 217                |
| Extruder C | 23.0        | 41         | 138               | 97                 | 213                |
| Extruder D | 58.0        | 49         | 170               | 120                | 214                |
| Extruder E | 87.6        | 44         | 165               | 112                | 213                |

A film having a layer structure as presented below was produced.

| Layer fraction (wt %) | Extruder | Material    |
|-----------------------|----------|-------------|
| 10%                   | A        | LDPE 2501N0W |
| 25%                   | B        | Supeer 8115 |
| 40%                   | C        | Supeer 8115 |
| 25%                   | D        | Supeer 8115 |
| 10%                   | E        | Cohere 8570 |

Example 2 (comparative). A film according to the state of the art was produced on a 5-layer co-extrusion blown film line as described below.

Line description and process settings:

| Number of extruders    | 5                                       |
|------------------------|-----------------------------------------|
| Number of layers       | 5                                       |
| Thickness              | 25 μm                                   |
| BUR (blow-up rate)     | 2.4                                     |
| Die                    | Gap: 2.4 mm; diameter 400 mm.           |
| Dual ring              | Double flow air ring, contactless type. |
| Air cooling temperature| 15° C.                                  |
| Ring                   | 51% of total power                      |
| IBC                    | 46% power                               |
| Line speed             | 55 m/min                                |
| Output                 | 240 kg/h                                |

Extruder temperature profiles (° C.):

|        | Extruder A | Extruder B | Extruder C | Extruder D | Extruder E |
|--------|------------|------------|------------|------------|------------|
| Zone 1 | 40         | 40         | 40         | 44         | 40         |
| Zone 2 | 199        | 186        | 210        | 187        | 198        |
| Zone 3 | 210        | 210        | 210        | 210        | 210        |
| Zone 4 | 210        | 210        | 210        | 210        | 210        |
| Zone 5 | 210        | 210        | 210        | 210        | 210        |
| Zone 6 | 210        | 210        | 210        | 210        | 210        |
| Zone 7 | 210        | 210        | 210        | 210        | 210        |
| Zone 8 | —          | 210        | —          | 210        | —          |

Die temperature profile (° C.):

| Zone 1 | Zone 2 | Zone 3 | Zone 4 | Zone 5 | Zone 6 |
|--------|--------|--------|--------|--------|--------|
| 210    | 210    | 210    | 210    | 220    | 220    |

Extruder settings:

|            | Output (kg/h) | Speed (rpm) | Torque (%) | Pressure (bar) | Melt temp (° C.) |
|------------|---------------|-------------|------------|----------------|--------------------|
| Extruder A | 36            | 40          | 14         | 196            | 221                |
| Extruder B | 47            | 53          | 21         | 196            | 219                |
| Extruder C | 73            | 22          | 45         | 224            | 218                |
| Extruder D | 48            | 53          | 20         | 181            | 216                |
| Extruder E | 36            | 42          | 13         | 180            | 223                |

A film having a layer structure as presented below was produced.

| Layer fraction (wt %) | Extruder | Material                                      |
|-----------------------|----------|-----------------------------------------------|
| 15%                   | A        | 91% Escorene Ultra FL00218 + 9% PIB           |
| 20%                   | B        | 75% Exceed 2018HA + 16% Enable 2703HH + 9% PIB |
| 30%                   | C        | 75% Exceed 2018HA + 16% Enable 2703HH + 9% PIB |
| 20%                   | D        | 75% Exceed 2018HA + 16% Enable 2703HH + 9% PIB |
| 15%                   | E        | 93% Exceed 1018HA + 7% PIB                    |

Peel cling force of the films prepared in examples 1 and 2 was determined in accordance with ASTM D5458, using films conditioned at 23° C., 50% RH, at 0% pre-stretch and at 100% pre-stretch, the results of which are presented below.

|                        | Example 1 | Example 2 |
|------------------------|-----------|-----------|
| Film thickness (μm)    | 26        | 23        |
| 0% pre-stretch         |           |           |
| Peel cling force (N)   | 4.38      | 3.00      |
| Peel cling (N/mm)      | 0.18      | 0.12      |
| 100% pre-stretch       |           |           |
| Peel cling force (N)   | 3.11      | 2.21      |
| Peel cling (N/mm)      | 0.13      | 0.09      |

The above results demonstrate that a film according to the present invention, wherein no PIB is present, allows for not only similar but even improved cling properties compared to the film according to the art, and further provides the benefits associated with the absence of PIB, in that a.o. migration during storage and use at elevated temperatures is reduced.

The invention claimed is:

1. A multi-layer film comprising at least three layers, with two outer layers, and one core layer, wherein:
   the core layer comprises an ethylene copolymer comprising 1-octene and having a density between >0.910 g/cm$^3$ and 0.925 g/cm$^3$, wherein further
   the first outer layer comprises between 5 wt. % and 30 wt. % of an ethylene homopolymer having a density of between >0.915 g/cm$^3$ and 0.930 g/cm$^3$ and between 70 wt. % and 95 wt. % of a first ethylene copolymer comprising 1-octene and having a density between >0.910 g/cm³ and 0.925 g/cm³ based on the total weight of the polymers of the layer, wherein further the second outer layer comprises between >50 wt. % and 90 wt. % of a first ethylene copolymer comprising 1-octene and having a density between >0.910 g/cm³ and 0.925 g/cm³ and between 10 wt. % and <50 wt. % of a second ethylene copolymer having a density of between 0.850 g/cm³ and <0.890 g/cm³ based on the total weight of the polymers of the layer.

2. The multi-layer film according to claim 1, wherein the second outer layer comprises <50 wt %, >50 wt % and <70 wt %, or >70 wt % of the second ethylene copolymer having a density of between 0.850 g/cm³ and <0.890 g/cm³, with regard to the total weight of the layer.

3. Multi-layer film according to claim 1, wherein
the second ethylene copolymer in the second layer has a melt mass-flow rate as determined in accordance with ISO1133:2011 at 190° C. under a load of 2.16 kg of >0.5 and <10.0 g/10 min; and/or
the first ethylene copolymer in the second layer has a melt mass-flow rate of >0.5 and <3.0 g/10 min; and/or
the ethylene copolymer in the core layer has a melt mass-flow rate of 0.5 and <3.0 g/10 min; and/or
the ethylene homopolymer in the first outer layer has a melt mass-flow rate of >0.2 and <2.5 g/10 min.

4. The multi-layer film according to claim 1, wherein the multilayer film consists of three layers and/or the multi-layer film consists of five layers and/or wherein both outer layers comprise the same first ethylene copolymer and/or wherein the multi-layer film comprises no polypropylene and/or wherein the multi-layer film is a multi-layer film for silage film applications and/or wherein the three layers or five layers are adjacent to each other.

5. The multi-layer film according to claim 1, wherein the multi-layer film and/or each of the three or five layers thereof comprises only polyolefins as polymers.

6. The multilayer film according to claim 1, wherein the second ethylene copolymer of the second outer layer comprises 1-hexene or 1-octene.

7. The multi-layer film according to claim 1, wherein the density of the first ethylene copolymer of the second outer layer is between 0.913 g/cm³ and 0.923 g/cm³, and/or the melt flow rate of the first ethylene copolymer of the second outer layer is between 0.2 and 2.5 g/10 min; and/or wherein the density of the second ethylene copolymer of the second outer layer is between 0.855 g/cm³ and 0.885 g/cm³, and/or the melt flow rate of the ethylene copolymer of the second ethylene copolymer of the second outer layer is between 1.7 and 20 g/10 min.

8. The multi-layer film according to claim 1, wherein the density of the ethylene homopolymer of the first outer layer is between 0.917 g/cm³ and 0.927 g/cm³, and/or the melt flow rate of the ethylene homopolymer of the first outer layer is between 0.2 and 2.5 g/10 min.

9. The multi-layer film according to claim 1, wherein the thickness of each outer layer represents between 10% and 20% of the total film thickness, and/or the multi-layer film comprises at least two intermediate layers and a thickness of each intermediate layer represents between 15% and 25% of the total film thickness, and/or the thickness of the core layer represents between 60% or 80% of the total film thickness.

10. Silage comprising a multi-layer film according to claim 1.

11. Packaging for silage comprising a multi-layer film according to claim 1.

12. The multi-layer film according to claim 1,
wherein the second outer layer comprises <50 wt %, >50 wt % and <70 wt %, or >70 wt % of the second ethylene copolymer having a density of between 0.850 g/cm³ and <0.890 g/cm³, with regard to the total weight of the layer; and
wherein the second ethylene copolymer in the second layer has a melt mass-flow rate as determined in accordance with ISO1133:2011 at 190° C. under a load of 2.16 kg of >0.5 and <6.0 g/10 min; and/or the first ethylene copolymer in the second layer has a melt mass-flow rate of >0.5 and <3.0 g/10 min; and/or the ethylene copolymer in the core layer has a melt mass-flow rate of 0.5 and <3.0 g/10 min; and/or the ethylene homopolymer in the first outer layer has a melt mass-flow rate of >0.2 and <2.5 g/10 min.

13. The multi-layer film according to claim 1, wherein multilayer film comprises no polypropylene.

14. The multi-layer film according to claim 1, comprising at least five layers, with two intermediate layers, wherein each intermediate layer comprises an ethylene copolymer comprising 1-octene and having a density between >0.910 g/cm³ and 0.925 g/cm³.

* * * * *